United States Patent
Konagai et al.

(10) Patent No.: US 11,527,010 B2
(45) Date of Patent: Dec. 13, 2022

(54) POSITIONING SYSTEM, POSITIONING METHOD, AND PROGRAM

(71) Applicant: NIPPON TELEGRAPH AND TELEPHONE CORPORATION, Tokyo (JP)

(72) Inventors: Shunsuke Konagai, Tokyo (JP); Hitoshi Seshimo, Tokyo (JP); Hirofumi Abe, Tokyo (JP); Yuki Kurauchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 107 days.

(21) Appl. No.: 17/054,758

(22) PCT Filed: May 13, 2019

(86) PCT No.: PCT/JP2019/018990
§ 371 (c)(1),
(2) Date: Nov. 11, 2020

(87) PCT Pub. No.: WO2019/221077
PCT Pub. Date: Nov. 21, 2019

(65) Prior Publication Data
US 2021/0225028 A1    Jul. 22, 2021

(30) Foreign Application Priority Data
May 15, 2018 (JP) .............................. JP2018-093704

(51) Int. Cl.
*G06T 7/73* (2017.01)
*G06T 7/579* (2017.01)

(52) U.S. Cl.
CPC ............... *G06T 7/74* (2017.01); *G06T 7/579* (2017.01)

(58) Field of Classification Search
None
See application file for complete search history.

(56) References Cited

U.S. PATENT DOCUMENTS

2015/0116509 A1* 4/2015 Birkler ............... H04N 1/00233
348/207.1

OTHER PUBLICATIONS

Susuki et al. (2008) "Extrinsic Camera Parameter Estimation from a Still Image Based on Feature Landmark Database," The Virtual Reality Society of Japan, vol. 13; No. 2 pp. 161-170.
Kalkusch et al. (2002) "Structured Visual Markers for Indoor Pathfinding," The First IEEE International Workshop Agumented Reality Toolkit,, Darmstadt, Germany, pp. 8, doi: 10.1109/ART.2002.1107018.

* cited by examiner

*Primary Examiner* — Delomia L Gilliard

(57) ABSTRACT

A position where a user is located can be estimated easily and quickly. When a hold detection unit 122 detects that the user holds a mobile terminal 100 by hand to use the mobile terminal 100 that is held by at least one hand of the user when used by the user and has a camera 130 on the surface facing the ceiling when used by the user, the estimation unit 240 estimates a position where a ceiling is located as the position where the user is located by using an image of the ceiling captured by the camera 130.

17 Claims, 10 Drawing Sheets

POSITIONING SYSTEM, POSITIONING METHOD, AND PROGRAM

CROSS-REFERENCE TO RELATED APPLICATIONS

This application is a U.S. 371 Application of International Patent Application No. PCT/JP2019/018990, filed on 13 May 2019, which application claims priority to and the benefit of JP Application No. 2018-093704, filed on 15 May 2018, the disclosures of which are hereby incorporated herein by reference in their entireties.

TECHNICAL FIELD

The present invention relates to a positioning system, a positioning method, and a program, and more particularly to a positioning system, a positioning method, and a program for positioning a mobile terminal indoors.

BACKGROUND ART

Conventionally, a technique of measuring the position of a terminal device is widely used, and the GPS is a representative of that. There is also a need for position measurement of terminal devices indoors.

As techniques to meet this need, there are, for example, a technique of receiving a signal from a beacon device that transmits radio waves, sound waves, or optical signals at regular intervals at a terminal device that performs position measurement, and measuring the position of a reception device from their signal strength and arrival time; a technique of diverting radio waves of a wireless LAN base station used for Internet communication without a dedicated radio beacon device having been installed; and a technique of transmitting beacon signals from a terminal device and receiving the signals at one or more antennas, microphones, cameras and the like that are installed at known locations to measure the position of the terminal device.

Further, as a method using images instead of beacon signals, there is a technique of estimating the position of a terminal device by calculating a geometrical relationship between a landscape picture taken by the terminal device whose position is to be measured and a landscape picture taken at a known location (NPL 1).

Also, there is a method of setting up markers in a range on which positioning is performed in order to simplify processing for calculating a geometrical relationship between landscape pictures (NPL 2).

CITATION LIST

Non Patent Literature

[NPL 1] "Extrinsic Camera Parameter Estimation from a Still Image Based on Feature Landmark Database", NPO corporation Japan Virtual Reality Society, The Virtual Reality Society of Japan Journal 13(2), 2008, 161-170.

[NPL 2] "Structured Visual Markers for Indoors Pathfinding", KALKUSCH M, Proc. of the First IEEE International Augmented Reality Toolkit Workshop (ART02), Darmstadt, Germany, 2002.

SUMMARY OF THE INVENTION

Technical Problem

However, in such techniques using beacon devices, there is a problem that the installation and operation of the beacon devices are costly, and installation places are also required for the beacon devices.

In addition, in the technique of transmitting a beacon signal from a terminal device, there is a problem that the installation and operation of receiving side equipment such as an antenna, a microphone, and a camera are costly.

Furthermore, in the technique of diverting radio waves of a wireless LAN base station used for Internet communication without a dedicated radio beacon device having been installed, although there is required no cost for the installation and operation of beacon devices, there is a problem that signals from the wireless LAN base station that has not been designed and installed for the purpose of positioning fail to form an appropriate signal strength distribution for indoor positioning, thereby making it difficult to provide highly accurate positioning.

Further, even in the technique using images, the method of setting up markers has a problem that it costs much to set up the markers and there is a place where the setup of the markers is not suitable.

In the technique of estimating the position of a terminal device by calculating a geometrical relationship between a landscape picture captured by the terminal device and a landscape picture captured at a known location, the problems associated with the above techniques are solved.

However, when that technique is implemented as a system, it is necessary to take a picture with a terminal device, which causes a problem that an uncommon wearable device such as a glasses-type camera is required to adapt to indoor positioning for pedestrians.

Here, it may be conceivable that a system is provided that uses a widely-used smartphone equipped with a camera or a mobile phone terminal with a camera, without using an uncommon wearable device such as a glasses-type camera.

In order to build such a system, it could be conceived by those skilled in the art to make a method of estimating the position of a terminal device by referring to a position reference database prepared in advance, as disclosed in NPL 1, with a landscape picture or an indoor picture, which is captured by the user of the terminal device who holds a camera, or feature data extracted from these pictures and performing some kind of geometrical calculation.

However, in such a method, the user of the terminal device needs to actively hold the terminal device in an attitude suitable for taking a picture, and thus there is a problem that it is not convenient for the user.

Further, there is a problem that a geometrical calculation for calculating the position and attitude of a camera is processing with a large processing load and is not suitable for being performed in a mobile terminal having a limited calculation capacity. Such processing may be performed by a server device connected to the terminal device via a communication line. However, in a system configuration in which processing tasks from a large number of users are concentrated on the server device, it is not preferable that the calculation processing to be performed in the server device also results in a high processing load.

The present invention has been made in view of the foregoing, and an object of the present invention is to provide a positioning system, a positioning method, and a program capable of easily and quickly estimating a position where the user is located.

Means for Solving the Problem

A positioning system according to the present invention is a positioning system that estimates a position where a user is located, and includes a ceiling image acquisition unit that acquires an image of a ceiling; and an estimation unit that estimates a position where the ceiling is located as the position where the user is located by using the acquired image of the ceiling. The image of the ceiling is captured by a camera when a mobile terminal detects that the user holds the mobile terminal by hand to use the mobile terminal, the mobile terminal being held by at least one hand of the user when used by the user and has the camera on a surface facing the ceiling when used by the user.

Further, a positioning method according to the present invention is a positioning method in a positioning system that estimates a position where a user is located, and includes capturing, by a camera, an image of a ceiling when a mobile terminal detects that the user holds the mobile terminal by hand to use the mobile terminal, the mobile terminal being held by at least one hand of the user when used by the user and has the camera on a surface facing the ceiling when used by the user; acquiring, by a ceiling image acquisition unit, the image of the ceiling that is captured by the mobile terminal; and estimating, by an estimation unit, a position where the ceiling is located as the position where the user is located by using the acquired image of the ceiling.

In the positioning system and the positioning method according to the present invention, the image of the ceiling is captured by the camera when the mobile terminal detects that the user holds the mobile terminal by hand to use the mobile terminal that is to be held by at least one hand of the user to use and has the camera on the surface facing the ceiling when used by the user.

Then, the ceiling image acquisition unit acquires the image of the ceiling captured by the mobile terminal, and the estimation unit estimates the position where the ceiling is located as the position where the user is located by using the acquired image of the ceiling.

As described above, the image of the ceiling is captured by the camera when the mobile terminal detects that the user holds the mobile terminal by hand to use the mobile terminal that is held by at least one hand of the user when used by the user and has the camera on the surface facing the ceiling when used by the user, and then the position where the ceiling is located is estimated as the position where the user is located by using the acquired image of the ceiling, which makes it possible to easily and quickly estimate the position where the user is located.

Further, the positioning system according to the present invention may further include a feature extraction unit that extracts a feature value of the image of the ceiling; and a feature storage unit that stores, for each of a plurality of small regions into which a predetermined space is divided, a feature value of an image of a ceiling corresponding to the small region and a position of the small region in the space. The estimation unit may estimate the position where the ceiling is located by comparing the feature value of the acquired image of the ceiling with the feature value of the image of the ceiling corresponding to each of the plurality of small regions, and set the estimated position as the position where the user is located.

Further, the positioning system according to the present invention may further include a feature update unit that updates, based on a combination of images of the ceiling acquired in time series and the small region corresponding to the position where the user is located estimated by the estimation unit, the feature value of the image of the ceiling in which a similarity to the image of the ceiling of the small region corresponding to the position where the user is located estimated by the estimation unit is lower than a predetermined value among the images of the ceiling acquired in time series, as the feature value of the image of the ceiling of the small region corresponding to the position where the user is located estimated by the estimation unit to be stored in the feature storage unit.

Further, in the positioning system according to the present invention, the plurality of small regions may be acquired by dividing the predetermined space so that adjacent small regions partially overlap each other.

Further, in the positioning system according to the present invention, the estimation unit may further correct the estimated position where the user is located by using an angle between an image-capturing direction and the ceiling when the image of the ceiling is captured, and a height of the ceiling.

Further, in the positioning system according to the present invention, the ceiling image acquisition unit may acquire an image of a floor together with the image of the ceiling, and the estimation unit may estimate a position where the ceiling and the floor are located by using the image of the ceiling and the image of the floor as the position where the user is located. The image of the floor is captured by a camera when the mobile terminal detects that the user holds the mobile terminal by hand to use the mobile terminal, and the mobile terminal has the camera on a surface facing the floor.

A program according to the present invention is a program for functioning as the units of the positioning system described above.

Effects of the Invention

According to the positioning system, the positioning method, and the program of the present invention, it is possible to easily and quickly estimate the position where the user is located.

DESCRIPTION OF EMBODIMENTS

Hereinafter, an embodiment of the present invention will be described with reference to the drawings.

Principle of Positioning System According to Embodiment of the Present Invention To begin with, the principle of an embodiment of the present invention will be described.

In the present embodiment, the position of a user is estimated based on a ceiling picture captured by a camera of a mobile terminal, such as a smartphone or a tablet terminal, which is held by at least one hand of the user, and an image of the ceiling acquired in advance.

Further, in the present embodiment, in order to perform positioning by using an action naturally taken by the user when taking the mobile terminal out to use without performing a specific action for the user to perform the positioning, the image of the ceiling acquirable upon the action is used.

Here, in contrast to a "global feature" which is a feature of the entire content such as an image, a feature of a part of the content is referred to as a "local feature". Examples of the global feature include feature values such as a color histogram of an image or a frequency feature obtained by the FFT. Further, in a digital image that is a local feature of an image and is a set of discrete pixels, a "feature point" that characterizes the image and a "local feature value" extracted from a set of pixels of a part of the image including the feature point are collectively referred to as an "image local feature". The "feature point" is pixels that defines an image local feature that characterizes the image.

Further, a set of all "global features" and "image local features" included in an image is referred to as an "image feature" of the image. In the present embodiment, the "global feature" is not used, and thus the set of "image local features" is the "image feature".

Further, the "feature value" is a multidimensional vector that represents the feature of a content so that it can be used in distance calculation, and the "local feature value" is a multidimensional vector that represents the feature of a part of the content (image) so that it can be used in distance calculation. In an image local feature, generally, a multidimensional vector extracted from a fixed number of pixels centering on a feature point is a local feature value.

Figure 3:
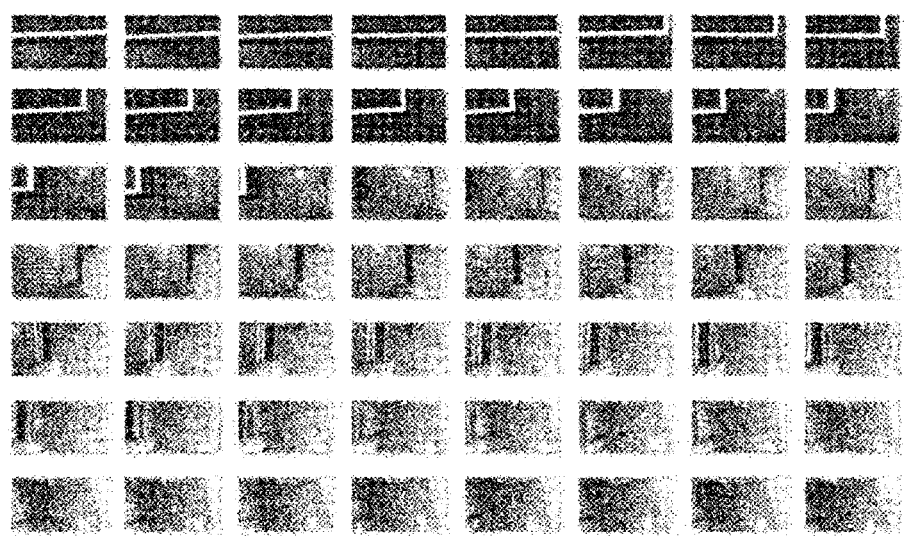
FIG. 3 illustrates examples of cut-out images of a ceiling according to the embodiment of the present invention.

As illustrated in FIG. 3, cutting out still images from a moving image captured by a camera facing a ceiling during walking makes it possible to extract image local features from each image of the ceiling. For example, FIG. 4 is an example of an image of a ceiling in a station.

Figure 4:
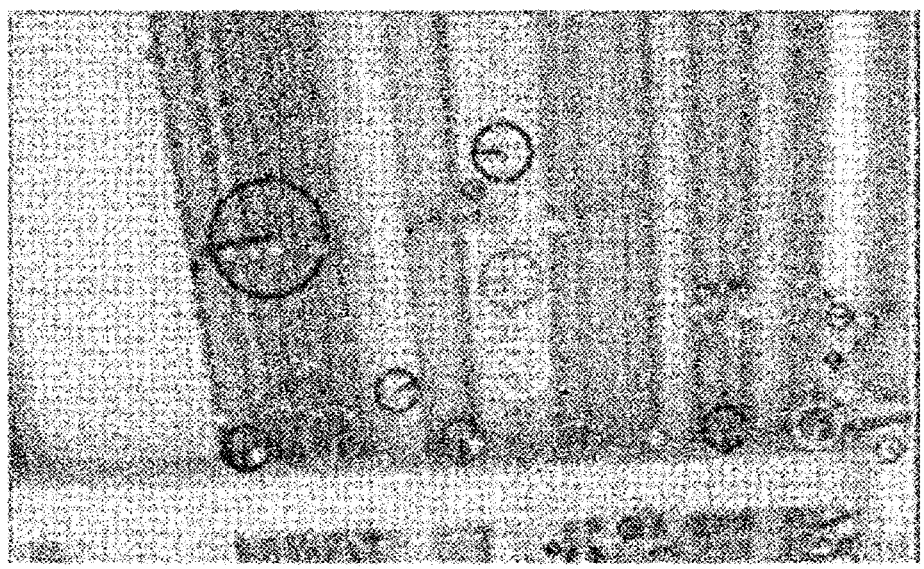
FIG. 4 is an image diagram illustrating an example of local features extracted form an image of a ceiling according to the embodiment of the present invention.

As illustrated in FIG. 4, it is possible to extract local features that are robust against rotation, scaling, and brightness change. In the present embodiment, a database is prepared in advance that stores local features extracted from such ceiling images in association with pieces of position information.

Then, using a ceiling image sent from the mobile terminal as a query, the database is searched for a ceiling image having those similar to the local feature values of the sent ceiling image.

Further, in the present embodiment, it is not necessary to install a wireless LAN, a BLE beacon, or the like.

Further, in a case of using pictures of forward view, it will take much time for three-dimensional position geometric calculation of feature points (or feature plane) because of its heavy processing. However, for ceiling pictures, their image capturing position is regarded as the position of the most similar picture.

Therefore, according to the present embodiment, it is possible to easily and quickly estimate the position where the user is located.

Figure 1:
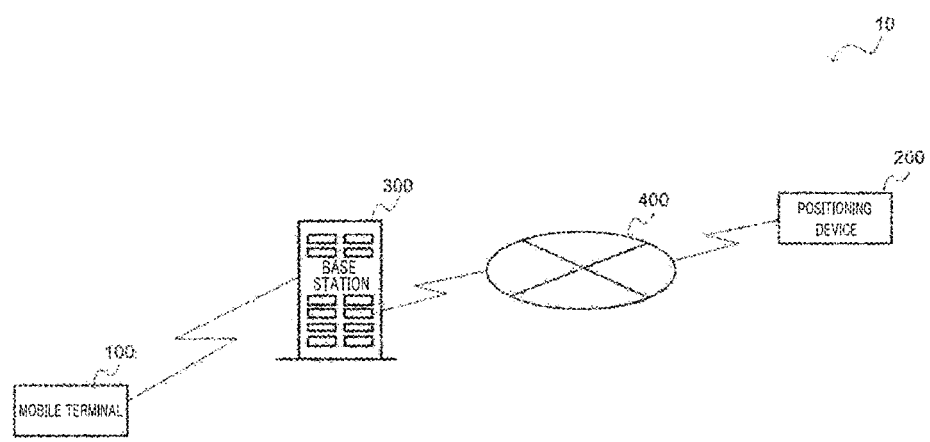
FIG. 1 is a schematic diagram illustrating a configuration of a positioning system 10 according to an embodiment of the present invention.

Configuration of Positioning System According to Embodiment of the Present Invention A configuration of a positioning system 10 according to the embodiment of the present invention will be described with reference to FIG. 1. FIG. 1 is a schematic diagram illustrating the configuration of the positioning system 10 according to the embodiment of the present invention.

The positioning system 10 includes a mobile terminal 100, a positioning device 200, and a base station 300, and the mobile terminal 100 and the positioning device 200 are connected via a network 400 such as the Internet.

The base station 300 is connected to the mobile terminal 100 by wireless communication established by any wireless communication standard. For example, the base station 300 is an access point defined in a wireless LAN standard, a base station used in wireless communication such as eNodeB defined in LTE, and the like.

The mobile terminal 100 is configured to be held by at least one hand of a user to use, and includes a computer including a CPU, a RAM, and a ROM that stores a program to execute a position estimation processing routine described below. The mobile terminal 100 is functionally configured as described below.

Figure 2:
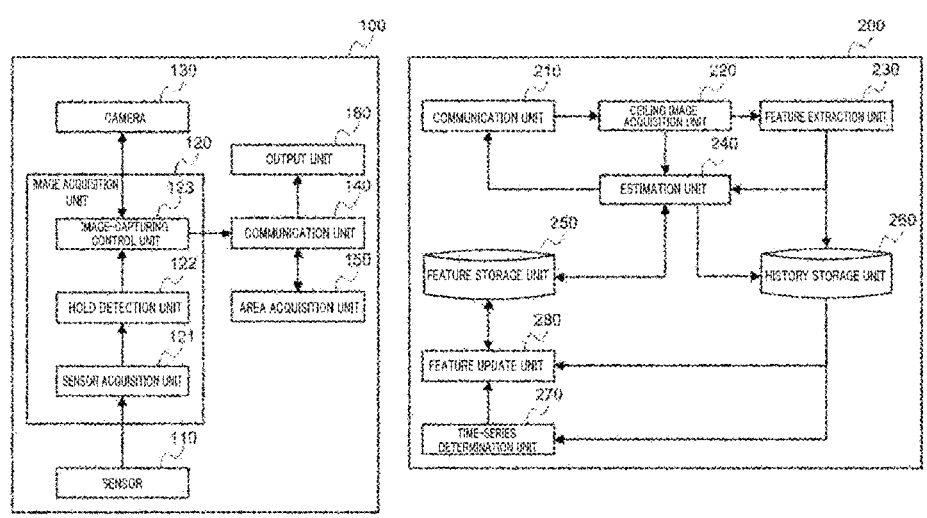
FIG. 2 is a block diagram illustrating configurations of a mobile terminal 100 and a positioning device 200 according to the embodiment of the present invention.

As illustrated in FIG. 2, the mobile terminal 100 includes a sensor 110, an image acquisition unit 120, a camera 130, a communication unit 140, an area acquisition unit 150, and an output unit 160. The mobile terminal 100 also has the camera 130 on a display surface facing a ceiling when used by the user.

The sensor 110 is a sensor for detecting the attitude of the mobile terminal 100.

Specifically, the sensor 110 is a gravity sensor or an acceleration sensor that acquires sensor information related to the attitude of the mobile terminal 100, and passes the acquired sensor information to the sensor acquisition unit 121.

The image acquisition unit 120 acquires an image of a ceiling.

Specifically, the image acquisition unit 120 includes a sensor acquisition unit 121, a hold detection unit 122, and an image-capturing control unit 123.

The sensor acquisition unit 121 periodically acquires the sensor information acquired by the sensor 110, and passes the acquired sensor information to the hold detection unit 122.

The hold detection unit 122 detects that the mobile terminal 100 is held by a hand of a user to use.

Specifically, the hold detection unit 122 first acquires from the mobile terminal 100 information as to whether the mobile terminal 100 is in an active state which allows the user to operate an application or the like, or in an inactive state such as sleep. This is because it is necessary to determine whether or not the mobile terminal 100 is in use by the user in order to perform positioning using the information acquired as a result of movement of the hand of the user who holds the mobile terminal 100. In other words, this is that user's normal use completes positioning without any intentional instruction to perform positioning of the mobile terminal, that is, without the user taking a specific action to acquire data necessary for positioning as well as a specific action to perform positioning.

Then, when the mobile terminal 100 is in the active state, the hold detection unit 122 detects, based on the sensor information, whether or not the display surface of the mobile terminal 100 in which the camera 130 is built faces a ceiling.

More specifically, the hold detection unit 122 determines that the display surface of the mobile terminal 100 faces the ceiling when the normal direction of the display surface of the mobile terminal 100 in which the camera 130 is built, which is obtained based on the vector direction of a gravitational acceleration obtained from output information of a triaxial acceleration sensor or a gravity sensor, is in a predetermined range including the direction just above, such that the camera 130 can extract the image features of the ceiling.

Accordingly, if the image-capturing direction of the camera 130 is successfully detected as being close to the direction just above, it is possible to capture a wider image of the ceiling, so that the position can be estimated more accurately.

Note that the hold detection unit 122 may be configured to repeat direction detection multiple times, and detect that the display surface faces the ceiling when the angle formed by the normal direction of the display surface of the mobile terminal 100 in which the camera 130 is built and the direction just above is smaller than a predetermined value.

When the mobile terminal 100 is in the active state and the display surface of the mobile terminal 100 in which the camera 130 is built faces the ceiling, the hold detection unit 122 detects that the mobile terminal 100 is held by the hand of the user to use. On the other hand, in other cases, the hold detection unit 122 does not detect that the mobile terminal 100 is held by the hand of the user to use. Note that, when the hold state continues, it is preferable that an image-capturing instruction is issued to the image-capturing control unit 123 at regular intervals in order to update positioning.

Then, the hold detection unit 122 passes a detection result to the image-capturing control unit 123.

The image-capturing control unit 123 issues an image-capturing instruction to the camera 130 to acquire a ceiling image captured by the camera 130 when the detection result obtained by the hold detection unit 122 indicates that the mobile terminal 100 is held by the hand of the user to use.

Then, the acquired ceiling image is passed to the communication unit 140.

When receiving the image-capturing instruction from the image-capturing control unit 123, the camera 130 captures an image of the ceiling. Then, the camera 130 passes the captured ceiling image to the image-capturing control unit 123.

The communication unit 140 transmits the ceiling image acquired by the image-capturing control unit 123 and area information received from the area acquisition unit 150 to the positioning device 200.

Further, the area acquisition unit 150 may narrow down a rough area using radio waves or the like used for the communication function of the mobile terminal.

The output unit 160 outputs a position of the user included in a positioning result received by the communication unit 140.

For example, the output unit 160 displays the current position of the user by a method such as marking the current position or displaying the position coordinates on a map displayed on the display on the display surface of the mobile terminal 100.

The positioning device 200 includes a computer including a CPU, a RAM, and a ROM that stores a program to execute a positioning processing routine described below, and is functionally configured as described below.

As illustrated in FIG. 2, the positioning device 200 includes a communication unit 210, a ceiling image acquisition unit 220, a feature extraction unit 230, an estimation unit 240, a feature storage unit 250, a history storage unit 260, a time-series determination unit 270, and a feature update unit 280.

The communication unit 210 receives the ceiling image and the area information from the mobile terminal 100. Then, the communication unit 210 passes the received ceiling image and area information to the ceiling image acquisition unit 220.

The communication unit 210 also transmits the positioning result acquired by the estimation unit 240 to the mobile terminal 100.

The ceiling image acquisition unit 220 acquires the ceiling image and the area information from the communication unit 210. Here, the ceiling image is captured by the camera 130 when the mobile terminal 100 detects that the user holds the mobile terminal 100 by hand to use the mobile terminal 100 that is to be held by at least one hand of the user to use and has the camera 130 on the surface facing the ceiling when used by the user.

Then, the ceiling image acquisition unit 220 passes the ceiling image to the feature extraction unit 230, and passes the area information to the estimation unit 240.

The feature extraction unit 230 extracts local features of the ceiling image.

Specifically, the feature extraction unit 230 extracts local features from the ceiling image acquired by the ceiling image acquisition unit 220 using a technique such as the SIFT (Reference Document 1). The local features are not limited to those to be extracted by SIFT, and may be any local feature as long as they have been put into practical use subsequent thereto and are robust against changes in image-capturing conditions.

[Reference Document 1] Distinct Image Features from Scale-Invariant Keypoints LOWE David G. IJCV, 2004, 91-110.

Then, the feature extraction unit 230 passes the local features extracted from the ceiling image to the estimation unit 240 and the history storage unit 260.

The feature storage unit 250 stores local features extracted in advance and a piece of information for identifying a small region including a ceiling picture from which each local feature is extracted among ceiling pictures captured in advance. The stored local features are searched for in similarity search using, as a key, one or more local features extracted by the feature extraction unit 230 of the mobile terminal 100.

Specifically, first, local features are extracted from each of a plurality of indoor ceiling pictures captured in advance to obtain a set of local features, and each of the local features included in the set of local features is associated with an image capturing position of the ceiling image from which the local feature is extracted.

Here, the information on the image capturing position may be information to be acquired by a simple method, such as information for identifying an image capturing location by a roller distance meter or the like with known coordinates as a reference, or information on an image capturing position obtained by capturing a moving image toward a ceiling while moving at a constant speed from a reference point, extracting still images from the moving image, and calculating the image capturing position based on the speed.

Further, if the topological positional relationship between image capturing locations is correct, information on an image capturing position whose absolute coordinates are not exactly correct may be provided.

Figure 5:
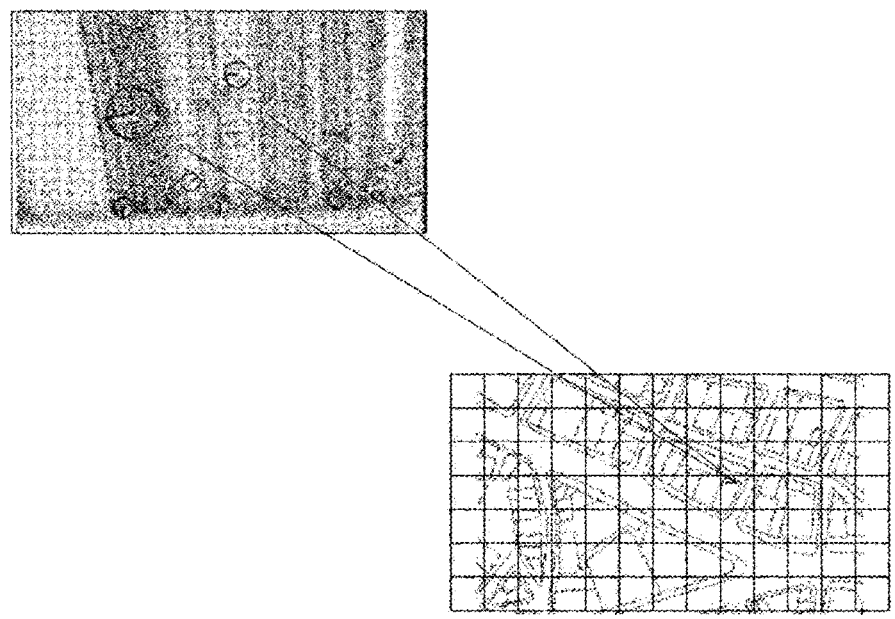
FIG. 5 is an image diagram illustrating an example of a plurality of small regions into which an indoor map is divided, according to the embodiment of the present invention.

Next, a predetermined space, for example, an indoor map as illustrated in FIG. 5 is divided into a plurality of small regions (lower right in FIG. 5), and for each of the local features included in the set of local features, an index associated with a small region corresponding to the image capturing position of the ceiling image from which the local feature is extracted is stored in the feature storage unit 250.

Here, a plurality of local features may be associated with one small region.

In the present embodiment, the feature storage unit 250 stores, for each area and for each of the local features included in the set of local features, an index associated with a small region corresponding to the image capturing position of the ceiling image from which the local feature is extracted among a plurality of small regions into which an indoor map of the area is divided.

Further, since it is possible to extract a small region having few local features at the time of creating the index or a small region that is likely to be confused in similarity search, an operation method may be adopted in which a marker image or the like is set up on the ceiling. Here, as the small region having few local features, a small region having a fixed number of local feature points or less may be extracted. Further, for the small region that is likely to be confused in similarity search, it may be extracted in a manner that all feature points are classified into clusters based on their feature values, a cluster frequency vector is created for each small region from the local features associated with the small region, and a distance between the cluster frequency vectors of a pair of small regions is calculated.

Further, the feature storage unit 250 may store a K-Means tree index having leaves corresponding to the local features for the set of local features.

This index is intended to perform most similar search for local features at high speed. Note that other index structures such as a KD tree other than the K-Means tree may be used.

The estimation unit 240 compares the acquired local features of the ceiling image with the local features of the ceiling image corresponding to each of the plurality of small regions to estimate the position where the ceiling is located, and sets the estimated position as the position where the user is located.

Specifically, the estimation unit 240 first narrows down the area in which the mobile terminal 100 is located, based on the area information acquired by the ceiling image acquisition unit 220.

The area information includes information indicating the position of the base station 300 and a communication method of wireless communication. Accordingly, the estimation unit 240 determines, as the area to be narrowed down, an area included in a circle whose radius is the transmission distance from the base station 300 determined by the communication method of wireless communication as centering on the position of the base station 300. The radius is determined to be, for example, 250 m for IEEE 802.11n, which is one wireless communication standard, and 200 m for the base station 300 being a femtocell base station.

Next, the estimation unit 240 obtains, for each of the one or more local features extracted from the acquired ceiling image, a local feature having future values having the highest similarity to those of the each local feature among the sets of local features stored in the feature storage unit 250.

Here, as the similarity, for example, a multidimensional Euclidean distance, a Hamming distance, or the like is used depending on the local feature value to be used.

Then, the estimation unit 240 acquires, for each local feature extracted from the acquired ceiling image, the small region of the area stored in the feature storage unit 250 in association with the local feature having the highest similarity. The estimation unit 240 counts, for each small region, the number of local features having the highest similarities to the local features extracted from the acquired ceiling image, and estimates the position of the small region having the highest count value as the position where the user is located. Note that the number of local features having the highest similarities is a similarity to the ceiling image corresponding to the small region.

The estimation unit 240 passes the estimated position where the user is located to the communication unit 210 and the history storage unit 260 as an estimation result.

The history storage unit 260 stores the small region corresponding to the position where the user is located estimated by the estimation unit 240, and the local features from the image of the ceiling at the position where the user is located extracted by the feature extraction unit 230 so that they are associated with each other. The history storage unit 260 also stores the similarity to the ceiling image corresponding to the small region of the position where the user is located, which is acquired when the position where the user is located is estimated by the estimation unit 240.

The time-series determination unit 270 determines whether or not the local features of the plurality of ceiling images stored in the history storage unit 260 are stored in time series.

Specifically, when the small regions are adjacent to each other in the small regions corresponding to the positions where the user has been located, which are stored in the history storage unit 260, the time-series determination unit 270 determines that the local features corresponding to the adjacent small regions are stored in time series.

Figure 6:
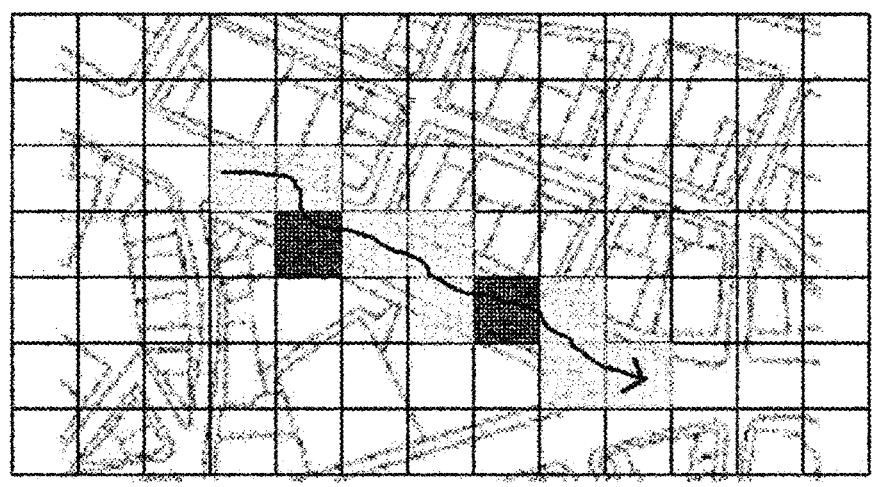
FIG. 6 is an image diagram illustrating an example of small regions through which a user has passed, according to the embodiment of the present invention.

The time-series determination unit 270 further extracts small regions through which the user has passed, as illustrated in FIG. 6, based on the adjacent small regions stored in time series.

Then, the time-series determination unit 270 passes a determination result to the feature update unit 280.

The feature update unit 280 updates, based on a combination of the ceiling images acquired in time series and the small region corresponding to the position of the mobile terminal 100 estimated by the estimation unit 240, the feature value of the ceiling image in which a similarity to the ceiling image of the small region corresponding to the position of the mobile terminal 100 estimated by the estimation unit 240 is lower than a predetermined value among the ceiling images acquired in time series, as the feature value of the ceiling image of the small region corresponding to the position of the mobile terminal 100 estimated by the estimation unit 240.

Specifically, the feature update unit 280 acquires, from the history storage unit 260, the similarity to the ceiling image corresponding to the small region acquired when the position where the user is located is estimated by the estimation unit 240, based on the determination result acquired by the time-series determination unit 270, for the plurality of ceiling images acquired in time series.

Next, when the acquired similarity is lower than the predetermined value, the feature update unit 280 updates the local feature of the ceiling image corresponding to the small region stored in the feature storage unit 250 corresponding to the position of the ceiling to the local feature of the acquired ceiling image.

In other words, if the ceiling image acquired when the position where the user is located is estimated has a similarity lower than the predetermined value to the ceiling image corresponding to the small region stored in the feature storage unit 250, the local feature of the acquired ceiling image is not similar to the local feature of the ceiling image corresponding to the small region stored in the feature storage unit 250 corresponding to the position of the ceiling. Therefore, it is highly possible that the local feature of the ceiling image stored in the feature storage unit 250 is not accurate.

Accordingly, the position of the small region is updated with the local feature of the ceiling image acquired when the position where the user is located is estimated.

Here, the update processing by the feature update unit 280 is started when a certain number or more of local features and positions are accumulated in the history storage unit 260 or each time a predetermined time elapses.

Accordingly, even if the indoor ceiling changes due to renovation, an event, or the like, the present invention can automatically update the information in the feature storage unit 250 when the image of the changed ceiling is captured by the user.

Note that the update processing may be started manually.

Figure 7:
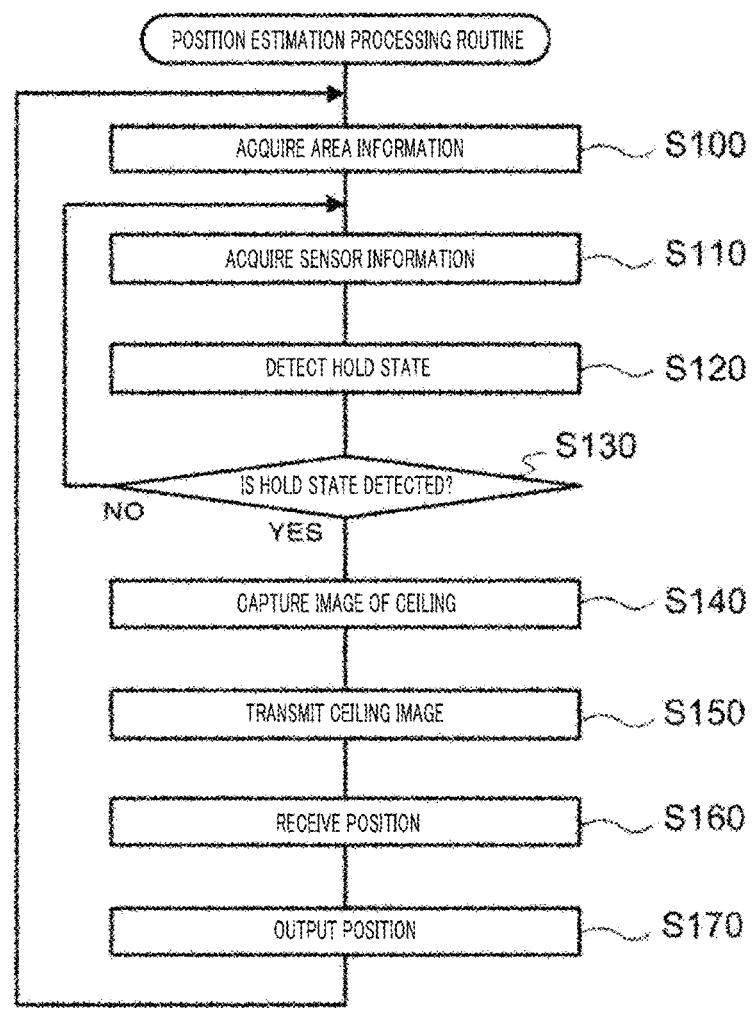
FIG. 7 is a flowchart illustrating a position estimation processing routine of the mobile terminal 100 according to the embodiment of the present invention.

Operation of Positioning System According to Embodiment of the Present Invention FIG. 7 is a flowchart illustrating a position estimation processing routine of the mobile terminal 100 in the positioning system 10 according to the embodiment of the present invention.

When sensor information is input to the sensor acquisition unit 121, the position estimation processing routine illustrated in FIG. 7 is executed in the mobile terminal 100.

First, in step S100, the area acquisition unit 150 acquires area information indicating the position of the base station 300, such as the ID of the base station 300 and the area ID, from a signal acquired by the communication unit 140.

In step S110, the sensor acquisition unit 121 acquires the sensor information acquired by the sensor 110.

In step S120, the hold detection unit 122 detects that the mobile terminal 100 is held by the hand of the user to use, based on the active state of the mobile terminal 100 and the sensor information.

In step S130, the hold detection unit 122 determines whether or not it is detected in step S120 that the mobile terminal 100 is held by the hand of the user to use.

When it is not detected that the mobile terminal 100 is held by the hand of the user to use (NO in step S130), the processing returns to step S110.

On the other hand, when it is detected that the mobile terminal 100 is held by the hand of the user to use (YES in step S130), the image-capturing control unit 123 issues an image-capturing instruction to the camera 130 to acquire a ceiling image captured by the camera 130 in step S140.

In step S150, the communication unit 140 transmits the ceiling image acquired by the image-capturing control unit 123 and the area information received from the area acquisition unit 150 to the positioning device 200.

In step S160, the communication unit 140 receives a positioning result including a position of the user from the positioning device 200.

In step S170, the output unit 160 outputs the position of the user included in the positioning result received by the communication unit 140.

Figure 8:
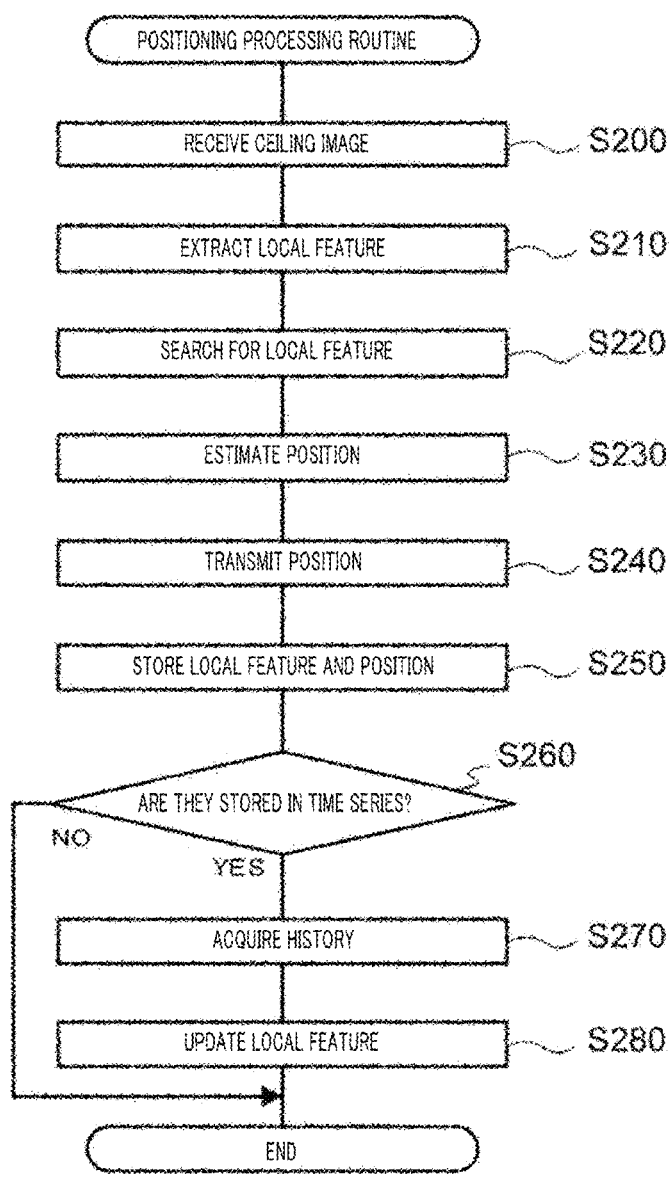
FIG. 8 is a flowchart illustrating a positioning processing routine of the positioning device 200 according to the embodiment of the present invention.

FIG. 8 is a flowchart illustrating a positioning processing routine of the positioning device 200 in the positioning system 10 according to the embodiment of the present invention.

When the communication unit 210 receives the ceiling image, the positioning device 200 executes the positioning processing routine illustrated in FIG. 8.

First, in step S200, the ceiling image acquisition unit 220 acquires the ceiling image and the area information from the communication unit 210.

In step S210, the feature extraction unit 230 extracts local features including one or more feature points of the ceiling image and their local features.

In step S220, the estimation unit 240 compares the feature values of the extracted one or more local features of the ceiling image with the feature values of the local features of the ceiling image corresponding to each of the plurality of small regions stored in the feature storage unit 250 corresponding to the acquired area information, thus to detect small regions each including the most similar local feature, and acquires a small region including the largest number of local features that are each the most similar to one of the one or more local features of the ceiling image.

In step S230, the estimation unit 240 estimates the small region including the largest number of most similar local features acquired in step S220 as the position of the acquired ceiling, and sets the estimated position as the position where the user is located.

In step S240, the communication unit 210 transmits the positioning result acquired in step S230 to the mobile terminal 100.

In step S250, the positioning device 200 stores, in the history storage unit 260, the small region corresponding to the position where the user is located estimated by the estimation unit 240, and the local features of the ceiling image extracted by the feature extraction unit 230 so that they are associated with each other.

In step S260, the time-series determination unit 270 determines whether or not the local features of the plurality of ceiling images stored in the history storage unit 260 are stored in time series.

When the images are stored in time series (YES in step S260), the feature update unit 280 acquires, from the history storage unit 260, the similarity to the ceiling image corresponding to the small region acquired when the position where the user is located is estimated by the estimation unit 240, for the plurality of ceiling images acquired in time series in step S270.

In step S280, the feature update unit 280 that updates, based on a combination of the ceiling images acquired in time series in step S270 and the small region corresponding to the position where the user is located estimated by the estimation unit 240, the local feature of the ceiling image in which a similarity to the ceiling image of the small region corresponding to the position where the user is located estimated by the estimation unit 240 is lower than a predetermined value among the ceiling images acquired in time series, as the local feature of the ceiling image of the small region corresponding to the position where the user is located estimated by the estimation unit 240 to be stored in the feature storage unit 250, and then the processing ends.

On the other hand, when it is not necessary to start the update processing (NO in step S260), the processing ends.

As described above, according to the positioning device according to the embodiment of the present invention, the ceiling image is captured by the camera when the mobile terminal detects that the user holds the mobile terminal by hand to use the mobile terminal that is held by at least one hand of the user when used by the user and has the camera on the surface facing the ceiling when used by the user, and then the position where the ceiling is located is estimated as the position where the user is located by using the acquired ceiling image, which makes it possible to easily and quickly estimate the position where the user is located.

Further, when a mobile terminal such as a smartphone or a tablet terminal is used in a natural attitude, it is possible to acquire a picture required for positioning using an image without the burden of the user actively capturing a picture, by video communication or capturing an self-picture of the user, that is, capturing a picture with a camera provided on the screen side of the mobile terminal for the purpose of so-called self-shooting.

Further, since a picture of a ceiling has the same position information on the plane coordinates with respect to the user, it is possible to estimate the position where the user is located by high-speed processing, without performing the high-load geometric calculation in which the three-dimensional coordinate position of a local feature of an image captured by a conventional image positioning technique is geometrically calculated to calculate the position and the orientation of the camera.

Further, extracting image local features from a ceiling picture and using them does not require to set up a marker or the like, so that the position where the user is located can be estimated at low cost.

Further, using a gravity sensor or an acceleration sensor that is generally provided in a mobile terminal makes it possible to ensure that a picture is captured with the camera being oriented in a range close to the direction just above and thus to reduce the misalignment due to a tilt of the mobile terminal. Therefore, it is possible to accurately estimate the position where the user is located.

Further, consolidating a plurality of ceiling images captured in advance into small regions makes it possible to increase the matching rate of search in position estimation and to reduce the search processing load.

Note that the present invention is not limited to the above-described embodiment, and various modifications and applications are possible without departing from the scope and spirit of the present invention.

For example, in the above-described embodiment, the positioning system including the mobile terminal 100 and the positioning device 200 is exemplified, but the respective units of the positioning device 200 may be included in the mobile terminal. In this case, a configuration may be provided in which the information in the feature storage unit is acquired from a server each time the area information changes.

Further, a configuration may be provided in which the respective units of the positioning device are included in the base station. If the base station connected to the mobile terminal has the feature storage unit for its own area, there is no connection through a public network, and thus the positioning processing can be performed at high speed. In addition, even if a handover is performed, the positioning can be performed smoothly.

Further, in the above-described embodiment, the image-capturing control unit 123 may be configured to acquire an image from the camera 130 at regular time intervals and use the image at the timing at which the hold is detected as the ceiling image.

Further, the mobile terminal 100 may be configured to transmit a floor image as well as a ceiling image to the positioning device. In this case, the mobile terminal 100 is configured to have the camera 130 on the display surface facing a ceiling when used by the user, and a camera on the surface opposite to the display surface facing a floor when used by the user. A configuration may be provided in which the image of the floor is captured by the camera (not illustrated) provided on the surface opposite to the display surface of the mobile terminal 100 when it is detected that the mobile terminal 100 is held by the hand of the user to use.

Then, the ceiling image acquisition unit 220 may be configured to acquire the floor image together with the ceiling image, and the estimation unit 240 may be configured to estimate the position where the ceiling is located by using the ceiling image, also estimate the position where the floor is located by using the floor image, and estimate the position where the user is located based on the respective estimation results.

With such a configuration, it is possible to accurately estimate the position where the user is located, even if there are features similar to different ceilings.

Further, even if the use is indoors such as a building having ceilings with few features, or is outdoors under no ceiling, it is possible to accurately estimate the position of the user as long as the user's place has a distinctive floor. For example, the position in a wide area such as an amusement park can be estimated. This is because it is expected that such a place has many distinctive floors such as floors on which an image according to the theme of the amusement park or symbols of characters are drawn.

Further, in the above-described embodiment, the feature extraction unit 230 extracts local features from the acquired ceiling image itself. However, it is expected that an object other than a ceiling such as the user's face or the like appears in the acquired ceiling image when the user holds the mobile terminal (left figure in FIG. 9).

Figure 9:
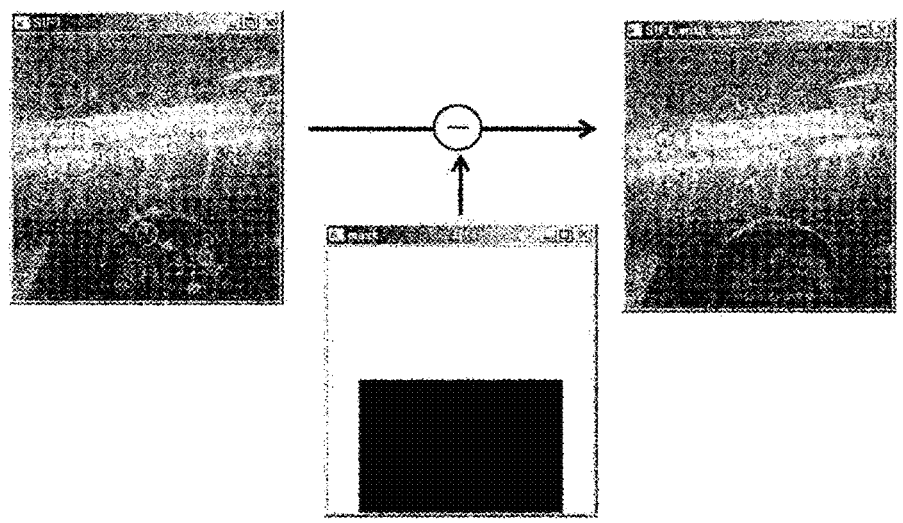
FIG. 9 is an image diagram illustrating an example of a case where a human face appears, according to the embodiment of the present invention.

Accordingly, assuming that an object other than a ceiling appears in the ceiling image, a configuration may be provided in which local features are extracted from an image obtained by performing masking processing on the ceiling image with a mask image prepared (middle figure in FIG. 9).

Further, a configuration may be provided in which local features of the ceiling image are extracted, it is determined whether or not a human face appears, and if the human face appears, the local features are extracted from the image on which the masking processing has been performed.

Figure 10:
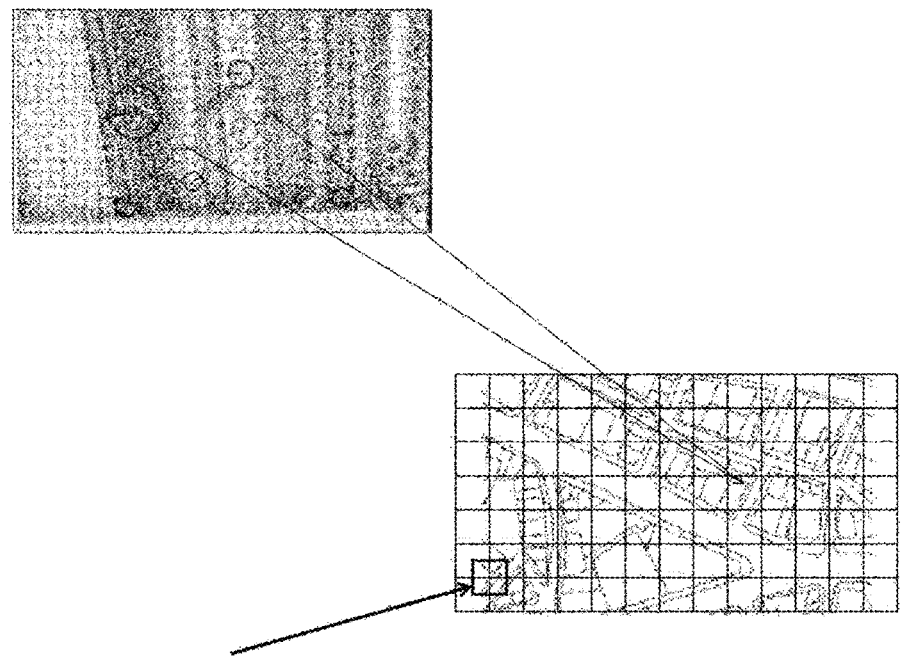
FIG. 10 is an image diagram illustrating an example of a plurality of overlapping small regions into which an indoor map is divided, according to the embodiment of the present invention.

Further, a configuration may be provided in which the plurality of small regions are obtained by dividing a predetermined space so that adjacent small regions partially overlap each other. In other words, the plurality of small regions are not mutually exclusive as illustrated in FIG. 5, and may be divided such that they are regions belonging to a grid as illustrated in FIG. 10.

With such a configuration, it is possible to prevent a large error caused by the user being located near a boundary on one side of the small regions that are mutually exclusive.

Further, the feature storage unit 250 may be configured to store an index associated with a small region for each local feature for each image capturing condition according to an angle of view of the camera or a difference in image capturing condition such as day and night, and the estimation unit 240 may be configured to estimate the position where the ceiling is located by using the index according to the capturing conditions for the ceiling image acquired by the ceiling image acquisition unit 220, and set the estimated position as the position where the user is located.

In this case, a configuration may be provided in which the image capturing condition for the acquired ceiling image is acquired from the mobile terminal 100.

With such a configuration, it is possible to prevent the matching rate between the feature of the ceiling image acquired in advance and the feature of the ceiling image used for positioning from being reduced, and thus to improve the positioning accuracy.

Further, the estimation unit 240 may be configured to correct the estimated position where the user is located by using the angle between the ceiling and the image-capturing direction when the ceiling image is captured, and the height of the ceiling.

If the display surface of the mobile terminal 100 is parallel to the ceiling or the floor when the ceiling image is captured, the position where the user is located is correctly estimated, and thus the position estimated by the estimation unit 240 does not need to be corrected.

However, if the display surface of the mobile terminal 100 is not parallel to the ceiling or floor, an image of the ceiling not directly above the position of the user is captured, which causes an error.

In this respect, the tilt of the mobile terminal 100 in the image-capturing direction of the camera and the height of the ceiling are used as additional parameters to correct the measured position according to the tilt.

As the height of the ceiling, for example, a distance between the mobile terminal 100 and the ceiling, a distance between the floor and the ceiling, or the like is used. Further, the height of the ceiling may be a height estimated at the timing of positioning or a height estimated in advance.

Note that, in this case, a correction amount is calculated based on various calculation methods such as a geometric calculation method and a weighted similarity calculation method.

Further, in this case, the estimation unit 240 may calculate an inner product between a vector between the coordinates of the feature points, in the ceiling image, of two local features consisting of the most similar local feature stored in the feature storage unit 250 and the other local feature having the highest similarity of feature value to the most similar local feature and a vector between the coordinates of the feature points, in a picture captured in advance when the feature points are extracted, of the corresponding local features stored in the feature storage unit 250, among the local features of the ceiling image acquired by the ceiling image acquisition unit 220, to calculate a relative orientation between the ceiling image and the picture captured in advance, and estimate the direction of capturing the acquired ceiling image by using the relative orientation.

With such a configuration, it is possible to accurately estimate the position where the user is located.

Further, when the ceiling images acquired in time series have a similarity lower than a predetermined value to the ceiling image stored in the feature storage unit 250 for the small region corresponding to the position of the ceiling and when the ceiling images acquired in time series have a similarity equal to or higher than a predetermined value to each of the ceiling images stored in the feature storage unit 250 for two or more small regions adjacent to that small region, the feature update unit 280 may update the local feature of the ceiling image corresponding to that small region stored in the feature storage unit 250 to the local feature of the ceiling image acquired when the position of that small region is estimated among the ceiling image acquired in time series as the position of the user by the estimation unit 240. This is because it is considered that there is more need for updating in such a case.

With such a configuration, the administrator can know a place where the local feature of the ceiling image needs to be updated due to a change in environment such as a building, and improve the reduced positioning accuracy. Further, since the local feature of the ceiling image corresponding to the small region that has been automatically stored can be updated, it is possible to prevent the positioning accuracy from being reduced.

Further, for each of a plurality of mobile terminals 100, when a similarity corresponding to a small region acquired when the position of the user of the mobile terminal 100 is estimated is lower than a predetermined value, the feature update unit 280 may increment the score for update for that small region, and update the local feature of the ceiling image corresponding to the small region whose score for update exceeds a predetermined value.

Further, when the ceiling images acquired in time series have a similarity lower than a predetermined value to the ceiling image stored in the feature storage unit 250 for the small region corresponding to the position of the ceiling and when the ceiling images acquired in time series have a similarity equal to or higher than a predetermined value to each of the ceiling images stored in the feature storage unit 250 for two or more small regions adjacent to that small region, the feature update unit 280 may increment the score for update for that small region, and update the local feature of the ceiling image corresponding to the small region whose score for update exceeds a predetermined value.

Further, in a case where the estimation unit 240 is configured to correct the estimated position where the user is located by using the angle between the image-capturing direction when the ceiling image is captured and the ceiling, and the height of the ceiling, the feature storage unit 250 may be configured to estimate the height of the ceiling by the SfM (Structure from Motion) or the like when creating the index.

Further, a configuration may be provided in which a plurality of types of local features such as SIFT, KAZE, and SURF are acquired in advance when the feature storage unit 250 is prepared, and an appropriate local feature is selected according to the property of a space such as a building.

For example, an index is created with a plurality of types of local features, and optimal local features for the space are determined by simulation.

With such a configuration, it is possible to avoid the acquisition of local features with low accuracy due to the different types of optimal local features depending on the space, and thus it is possible to accurately estimate the position where the user is located.

Further, the feature values to be indexed may be classified into clusters, the clusters may be regarded as terms, and the grids may be regarded as documents to calculate the idf of each cluster, so that the similarity calculation can be performed using tf·idf.

Further, in the above embodiment, a smartphone or a tablet terminal is taken as an example of the mobile terminal 100, but the mobile terminal is not limited to them.

For example, a wearable device such as a headphone, glasses, and a necklace is also the mobile terminal that can capture the position where the user is located. Specifically, the wearable device may be configured to include a camera, and measure the position of the user using a ceiling image.

Further, a configuration may be provided in which a camera is mounted in a device that includes self-position measuring means and passes through a building, such as a cleaning robot, a luggage carrier, and a roller distance meter, and the feature storage unit 250 is updated at any time.

Further, in the description of the present application, the embodiment is described in which the program is installed in advance. However, the program may be stored in a computer-readable recording medium and provided.

REFERENCE SIGNS LIST

10 Positioning system
100 Mobile terminals
110 Sensor
120 Image acquisition unit
121 Sensor acquisition unit
122 Hold detection unit
123 Image-capturing control unit
130 Camera
140 Communication unit
150 Area acquisition unit
160 Output unit
200 Positioning device
210 Communication unit
220 Ceiling image acquisition unit
230 Feature extraction unit
240 Estimation unit
250 Feature storage unit
260 History storage unit
270 Time-series determination unit
280 Feature update unit
300 Base station
400 Network

The invention claimed is:

1. A computer-implemented method for determining a user position, the method comprising:
receiving an image of a ceiling, wherein the image of the ceiling is captured by a camera when a mobile computing device detecting the user holding the mobile computing device facing toward a surface facing the ceiling by hand to use the mobile computing device, and
determining one or more feature values of the image of the ceiling;
for each of a plurality of sub-regions that divides a predefined space, storing a feature value of a part of the image of the ceiling corresponding to a sub-region and a position of the sub-region in the space;
determining, based on the received image of the ceiling and the stored feature value of the part of the image of the ceiling corresponding to the sub-region, the position of the ceiling; and
determining, based on the determined position of the ceiling, the user position.

2. The computer-implemented method of claim 1, the method further comprising:
updating, based on a combination of a plurality of images of the ceiling received in time series and a sub-region of the plurality of sub-regions associated with the determined user position, the one or more feature values of the image of the ceiling, wherein a degree of similarity between at least one of the plurality of images of the ceiling and the sub-region is less than a predetermined threshold degree of similarity.

3. The computer-implemented method of claim 1, wherein the plurality of sub-regions includes at least in part overlapping adjacent sub-regions.

4. The computer-implemented method of claim 1, the method further comprising:
correcting the user position based at least on a combination of:
an angle between a direction of capturing the image of the ceiling and the ceiling, and
a height of the ceiling.

5. The computer-implemented method of claim 1, the method further comprising:
receiving an image of a floor;
determining, based on the received image of the ceiling and the received image of the floor, a position of the ceiling of the floor as the user position.

6. The computer-implemented method of claim 1, the method further comprising:
receiving an image of a floor;
determining, based on the received image of the ceiling and the received image of the floor, a position of the ceiling of the floor as the user position.

7. A system for determining a user position, the system comprises:
a processor; and
a memory storing computer-executable instructions that when executed by the processor cause the system to:
receive an image of a ceiling, wherein the image of the ceiling is captured by a camera when a mobile computing device detecting the user holding the mobile computing device facing toward a surface facing the ceiling by hand to use the mobile computing device, and
Determine one or more feature values of the image of the ceiling;
for each of a plurality of sub-regions that divides a predefined space, store a feature value of a part of the image of the ceiling corresponding to a sub-region and a position of the sub-region in the space;
determine, based on the received image of the ceiling and the stored feature value of the part of the image of the ceiling corresponding to the sub-region, the position of the ceiling; and
determine, based on the determined position of the ceiling, the user position.

8. The system of claim 7, the computer-executable instructions when executed further causing the system to:

update, based on a combination of a plurality of images of the ceiling received in time series and a sub-region of the plurality of sub-regions associated with the determined user position, the one or more feature values of the image of the ceiling, wherein a degree of similarity between at least one of the plurality of images of the ceiling and the sub-region is less than a predetermined threshold degree of similarity.

9. The system of claim 7, wherein the plurality of sub-regions includes at least in part overlapping adjacent sub-regions.

10. The system of claim 7, the computer-executable instructions when executed further causing the system to:
correct the user position based at least on a combination of:
an angle between a direction of capturing the image of the ceiling and the ceiling, and
a height of the ceiling.

11. The system of claim 7, the computer-executable instructions when executed further causing the system to:
receive an image of a floor;
determine, based on the received image of the ceiling and the received image of the floor, a position of the ceiling of the floor as the user position.

12. The system of claim 7, the computer-executable instructions when executed further causing the system to:
receive an image of a floor;
determine, based on the received image of the ceiling and the received image of the floor, a position of the ceiling of the floor as the user position.

13. A computer-readable non-transitory recording medium storing computer-executable instructions that when executed by a processor cause a computer system to:
receive an image of a ceiling, wherein the image of the ceiling is captured by a camera when a mobile computing device detecting the user holding the mobile computing device facing toward a surface facing the ceiling by hand to use the mobile computing device, and
determine one or more feature values of the image of the ceiling;
for each of a plurality of sub-regions that divides a predefined space, store a feature value of a part of the image of the ceiling corresponding to a sub-region and a position of the sub-region in the space;
determine, based on the received image of the ceiling and the stored feature value of the part of the image of the ceiling corresponding to the sub-region, the position of the ceiling; and
determine, based on the determined position of the ceiling, the user position.

14. The computer-readable non-transitory recording medium of claim 13, the computer-executable instructions when executed further causing the system to:
update, based on a combination of a plurality of images of the ceiling received in time series and a sub-region of the plurality of sub-regions associated with the determined user position, the one or more feature values of the image of the ceiling, wherein a degree of similarity between at least one of the plurality of images of the ceiling and the sub-region is less than a predetermined threshold degree of similarity.

15. The computer-readable non-transitory recording medium of claim 13, wherein the plurality of sub-regions includes at least in part overlapping adjacent sub-regions.

16. The computer-readable non-transitory recording medium of claim 13, the computer-executable instructions when executed further causing the system to:
correct the user position based at least on a combination of:
an angle between a direction of capturing the image of the ceiling and the ceiling, and
a height of the ceiling.

17. The computer-readable non-transitory recording medium of claim 13, the computer-executable instructions when executed further causing the system to:
receive an image of a floor;
determine, based on the received image of the ceiling and the received image of the floor, a position of the ceiling of the floor as the user position.

* * * * *